(12) United States Patent
Perrot et al.

(10) Patent No.: US 8,457,083 B2
(45) Date of Patent: Jun. 4, 2013

(54) DEVICE FOR CONNECTING A WIRELESS NETWORK TO AT LEAST ONE OTHER NETWORK

(75) Inventors: Sébastien Perrot, Rennes (FR); Ludovic Jeanne, Rennes (FR); Gilles Straub, Acigné (FR); Caroline Landry, Cesson Sévigné (FR)

(73) Assignee: Thomson Licensing, Issy les Moulineaux (FR)

( * ) Notice: Subject to any disclaimer, the term of this patent is extended or adjusted under 35 U.S.C. 154(b) by 252 days.

(21) Appl. No.: 10/660,141

(22) Filed: Sep. 11, 2003

(65) Prior Publication Data

US 2005/0192013 A1 Sep. 1, 2005

(30) Foreign Application Priority Data

Sep. 12, 2002 (EP) ..................... 02292228
Apr. 24, 2003 (EP) ..................... 03290998

(51) Int. Cl.
*H04W 4/00* (2009.01)
(52) U.S. Cl.
USPC ........ 370/338; 370/328; 370/351; 370/395.5; 370/395.52; 370/395.53; 370/401; 370/465; 370/466; 455/41.2; 455/550.1; 455/552.1; 455/445; 709/227; 709/228; 709/230; 709/238; 709/249
(58) Field of Classification Search
USPC .................. 370/254–256, 338, 401, 400, 328, 370/351, 395.5, 395.52, 395.53, 465, 466; 709/223, 220, 227, 228, 230, 238, 249; 455/41.2, 445, 550.1, 552.1
See application file for complete search history.

(56) References Cited

U.S. PATENT DOCUMENTS

| | | | | |
|---|---|---|---|---|
| 5,570,366 A * | 10/1996 | Baker et al. | .................. | 370/312 |
| 5,602,851 A * | 2/1997 | Terashita et al. | ............. | 370/403 |
| 5,812,531 A * | 9/1998 | Cheung et al. | ................ | 370/255 |
| 5,907,544 A * | 5/1999 | Rypinski | ........................ | 370/337 |
| 6,169,741 B1 * | 1/2001 | LeMaire et al. | ............. | 370/401 |
| 6,400,702 B1 * | 6/2002 | Meier | ......................... | 370/338 |
| 6,407,991 B1 * | 6/2002 | Meier | ......................... | 370/338 |
| 6,452,910 B1 * | 9/2002 | Vij et al. | ....................... | 370/310 |
| 6,822,946 B1 * | 11/2004 | Wallace | ....................... | 370/328 |
| 6,934,263 B1 * | 8/2005 | Seaman | ....................... | 370/256 |
| 6,947,483 B2 * | 9/2005 | Engwer | ........................ | 375/240 |
| 6,947,736 B2 * | 9/2005 | Shaver et al. | ................. | 455/424 |
| 7,095,748 B2 * | 8/2006 | Vij et al. | ....................... | 370/401 |
| 7,099,295 B1 * | 8/2006 | Doyle et al. | .................. | 370/338 |
| 7,289,463 B2 * | 10/2007 | Ozugur | ........................ | 370/328 |
| 7,379,459 B2 * | 5/2008 | Ohnishi | ........................ | 370/392 |
| 2002/0181412 A1 * | 12/2002 | Shibasaki | .................... | 370/256 |
| 2002/0181478 A1 * | 12/2002 | Shizume | ....................... | 370/401 |
| 2002/0196795 A1 * | 12/2002 | Higashiyama | ................ | 370/401 |
| 2003/0120763 A1 * | 6/2003 | Volpano | ........................ | 709/223 |
| 2004/0141522 A1 * | 7/2004 | Texerman et al. | ............ | 370/466 |

* cited by examiner

*Primary Examiner* — Olumide T Ajibade Akonai
(74) *Attorney, Agent, or Firm* — Robert D. Shedd; Jeffrey M. Navon; Catherine A. Cooper

(57) ABSTRACT

Device for connecting a wireless network to at least one other network comprising a bridge module for managing a plurality of ports for connecting to respective networks, the device comprising a wireless network management module for managing associations, with an access point of a centralized wireless network, of devices of networks (connected to the bridge device other than the wireless network; wherein the bridge device is adapted to be a station of the wireless network.

10 Claims, 4 Drawing Sheets

DEVICE FOR CONNECTING A WIRELESS NETWORK TO AT LEAST ONE OTHER NETWORK

This application claims the benefit under 35 U.S.C. §365 of European patent applications Numbered 02292228.0 filed Sep. 12, 2002, and 03290998.8 filed Apr. 24, 2003.

BACKGROUND OF THE INVENTION

The invention concerns a device for connection to a wireless network, wherein the device is connected to at least one other network. The invention may be used for connecting, for example, an Ethernet and/or a USB network to a wireless network such as IEEE 802.11.

In a centralized wireless network, e.g. conforming to IEEE 802.11 (BSS), a device called Access Point (AP) centralizes certain management functions, in particular medium access and data unit delivery between stations.

In IEEE 802.11, the Access Point may comprise a bridge function, in order to allow the connection of the wireless network to another network of any type, e.g. a local area network (LAN), for example an Ethernet LAN or another network of the IEEE 802.x type. IEEE 802.11 refers to this function as Distribution System Service (DSS), as described in sections 5.2 to 5.4 of the document ISO/IEC 8802-11, 1$^{st}$ edition, 1999.

In HiperLAN2, another centralized wireless network, the model is more generic in the sense that it supports different types of core networks (and not only 802.x networks), as described in the HiperLAN2 system overview (ETSI TR 101 683). While mostly focused on Ethernet core networks (where the architecture is homogeneous with 802.11 DS (Distribution System)), the relevant document is the HiperLan2 Ethernet SSCS TS (ETSI TS 101 493 part 2).

Bridging functions in general are described e.g. in ISO/IEC 15802-3:1998 (also known as ANSI/IEEE Std 802.1D). A bridge as defined in this document possesses two or more IEEE 802.x compliant MAC interfaces. In order to avoid passing useless data, the bridge sets up a filtering table for each MAC interface. Each table is fed with source MAC addresses of packets detected on the corresponding interface. The bridge does not forward packets with destination addresses it spots in the filtering table of the interface on which the packets were detected. An ageing process is applied to the filtering tables in the sense that source addresses that are not detected for a certain time are removed from the tables.

FIG. 1 illustrates a prior art network comprising three wireless basic service set (BSS) networks comprising a number of stations (STA) connected through their respective access points (AP) to an Ethernet wired network.

Since only one Access Point is allowed per BSS, it is impossible to use a wireless network of this type to act as a backbone for connecting other networks.

BRIEF SUMMARY OF THE INVENTION

The invention concerns a device for connecting a wireless network to at least one other network comprising a bridge module for managing a plurality of ports for connecting to respective networks; characterized in that the device comprises a link management module for managing associations with an access point of a centralized wireless network and devices of networks connected to the bridge device other than the wireless network; wherein the bridge device is adapted to be a station of the wireless network.

Allowing a station of the wireless network to host a bridge and having the station register with the access point of the wireless network for devices connected to the station allows use of a wireless network as backbone. Moreover, there is transparency for the access point, which can be a standard access point in the sense that it does not need to be aware of the specificity of the device according to the invention. The bridge device according to the invention is not a central access point of the backbone network.

According to an embodiment of the invention, the device further comprises means for determining a spanning tree for all networks attached to the device, comprising means for enabling or disabling the determination of the spanning tree.

According to an embodiment of the invention, the device further comprises means for updating filtering tables for respective connected networks, said filtering tables comprising information for determining whether a message on a network is to be forwarded to another network or not, said updating using a process by default, comprising means for enabling or disabling the default process.

According to an embodiment of the invention, the default process is based on analysis of source addresses in messages detected on a respective network, comprising means for enabling or disabling message detection based updating.

According to an embodiment of the invention, the device further comprises means for updating a filtering table for a given network based on a device discovery process specific to the given network.

According to an embodiment of the invention, the default process is enabled for an Ethernet network.

According to an embodiment of the invention, the default process is disabled for a USB network.

According to an embodiment of the invention, the device further comprises means for generating a message to link the management module upon a filtering table amendment, said means for generating a message having an enabled state and a disabled state for each network.

According to an embodiment of the invention, the means for generating a message are enabled for an Ethernet network.

BRIEF DESCRIPTION OF THE SEVERAL VIEWS OF THE DRAWINGS

Other characteristics and advantages will appear through the description of a non-restrictive embodiment of the invention.

DETAILED DESCRIPTION OF AN EMBODIMENT

The present embodiment concerns a wireless network of the IEEE 802.11 type used as a backbone for connecting several other networks. The backbone may be based on another wireless centralized network type than 802.11, such as HiperLAN 2. In the present embodiment, the 'other' networks are based on the Universal Serial Bus (USB) and Ethernet (IEEE 802.3), but the invention is not limited to these examples. In particular, other IEEE 802 type networks may be connected through the wireless backbone network.

The general notions of spanning tree, filtering base learning and ageing processes are described in IEEE 802.1D mentioned in the introduction. These mechanisms will however be adapted as described below.

Figure 1:
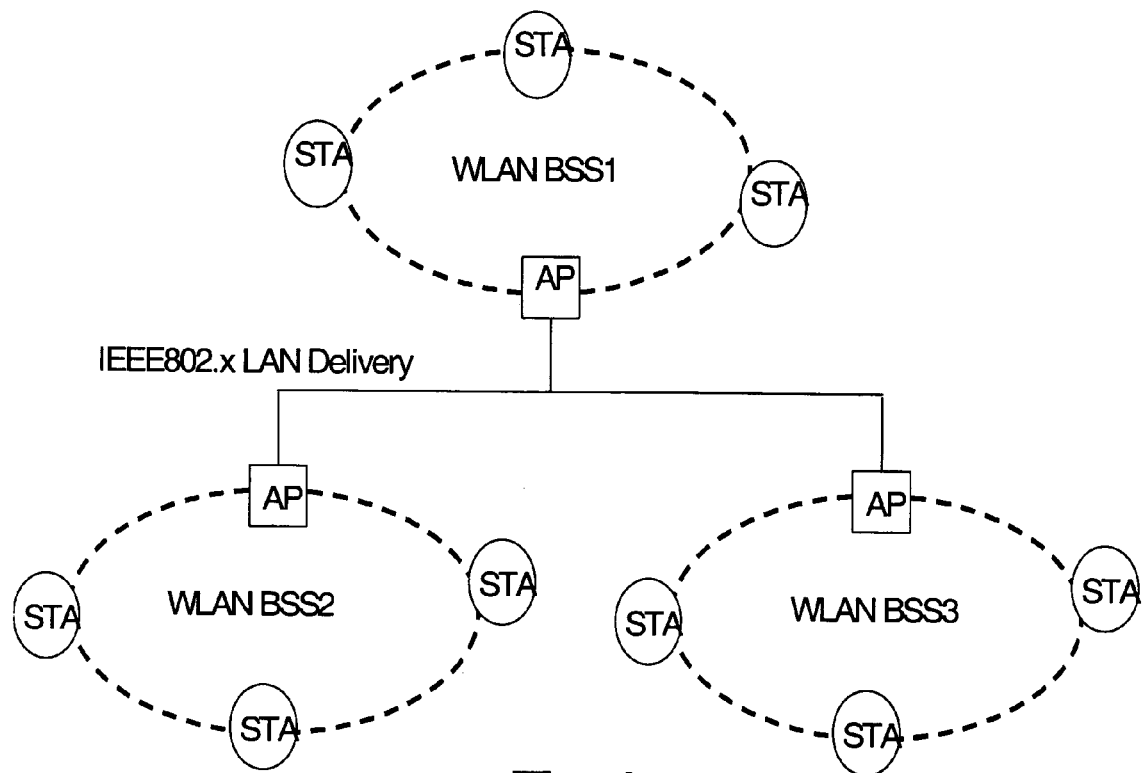
FIG. 1, already described, represents three wireless networks interconnected by a wired network.
Figure 2:
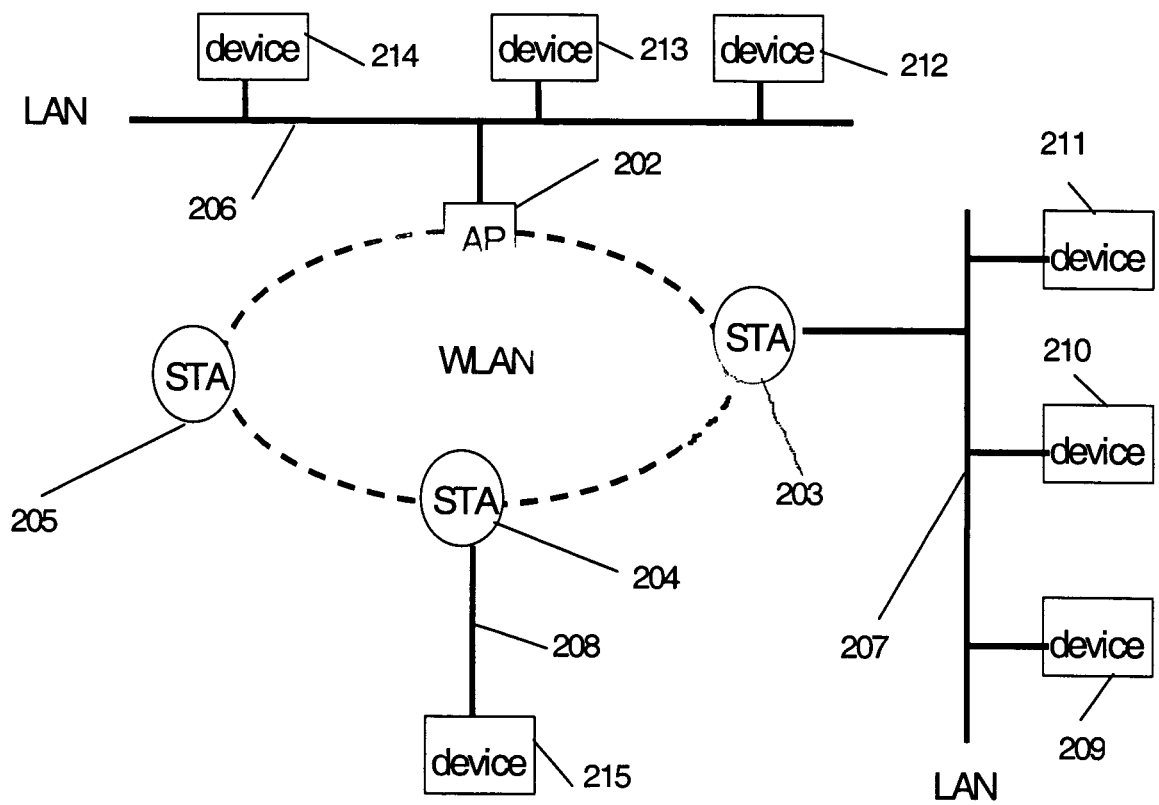
FIG. 2 is a diagram representing a plurality of networks interconnected through a wireless network, according to bridge devices conforming to the present embodiment.

FIG. 2 is a schematic diagram of a set of networks interconnected with the help of bridge devices according to the embodiment. The set of networks comprises wireless network 201, Ethernet networks 206 and 208, and USB bus 207. The wireless network comprises one access point 202 (AP) and three mobile stations 203, 204 and 205 (STA), and has the form of a Basic Service Set (BSS). Mobile station 205 is a pure IEEE 802.11 device or a station according to the present embodiment, but without connected devices. The access point 202 and the other two stations 203 and 204 are connected respectively to networks 206, 207 and 208. One or more devices (resp. 212, 213, 214 and 209, 210, 211 and 215) are connected to each of the busses 206, 207 and 208. While each station in FIG. 2 connects only two networks (the wireless network and one wired network), more than two networks may be supported by a single station.

At least the stations 203 and 204 are stations modified to support a certain number of additional features compared to a typical IEEE 802.11 station.

First, each station's wireless interface is capable of managing several MAC addresses in view of association with the access point. These MAC addresses correspond to the devices on one of the non-wireless networks attached to the station. This particular feature is the object of a previous European patent application, filed on Sep. 12, 2002 in the name of Thomson Licensing S.A. and having the application number 02292228.0. The bridge station associates as many times with the access point as there are devices connected to it, in addition to its own association. From the point of view of the wireless network, each device connected to the wired bus connected to such a station will appear as a wireless station. The station itself will manage the data flow for each device connected to it through the wired network.

A station's bridge features are based on IEEE 802.1D, both on the wireless interface(s) and on the wired interface(s). Moreover, each station possesses a so-called link management module for monitoring traffic on the wired network(s) and for managing associations on the wireless network(s) upon detection of new devices and disassociations when the ageing process defined in IEEE 802.1D removes an entry for a bridge filtering table.

Figure 3:
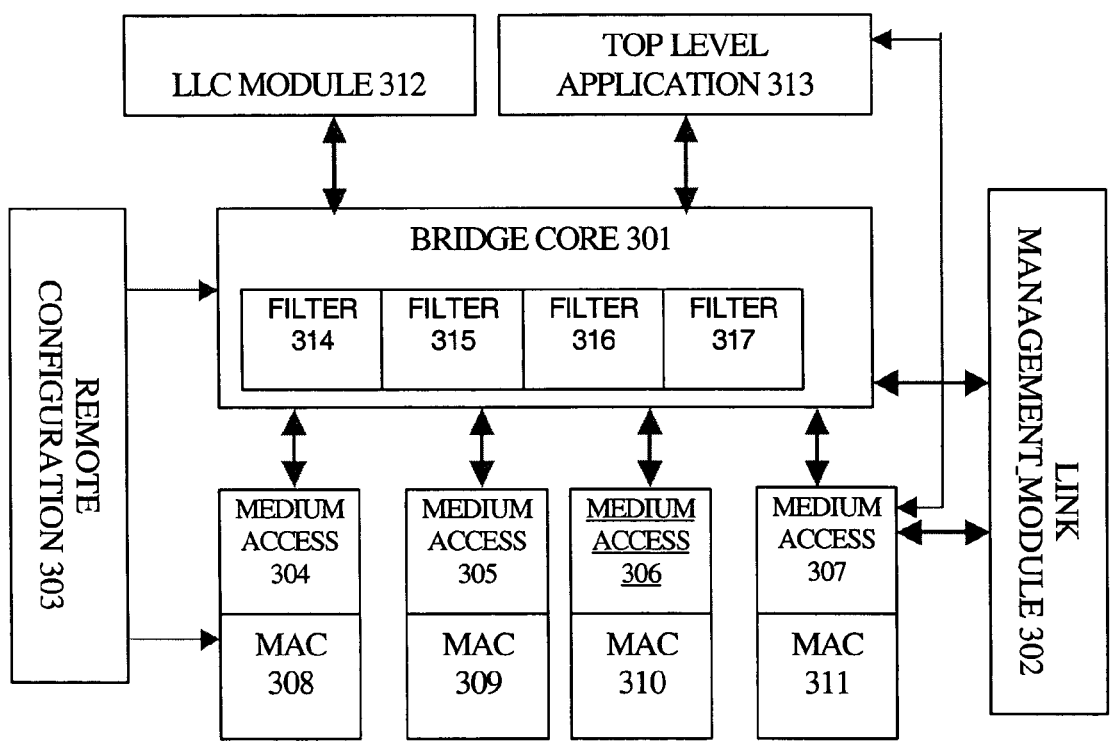
FIG. 3 is a diagram representing the software modules of a wireless station or access point functioning as a bridge according to the present embodiment.
Figure 4:
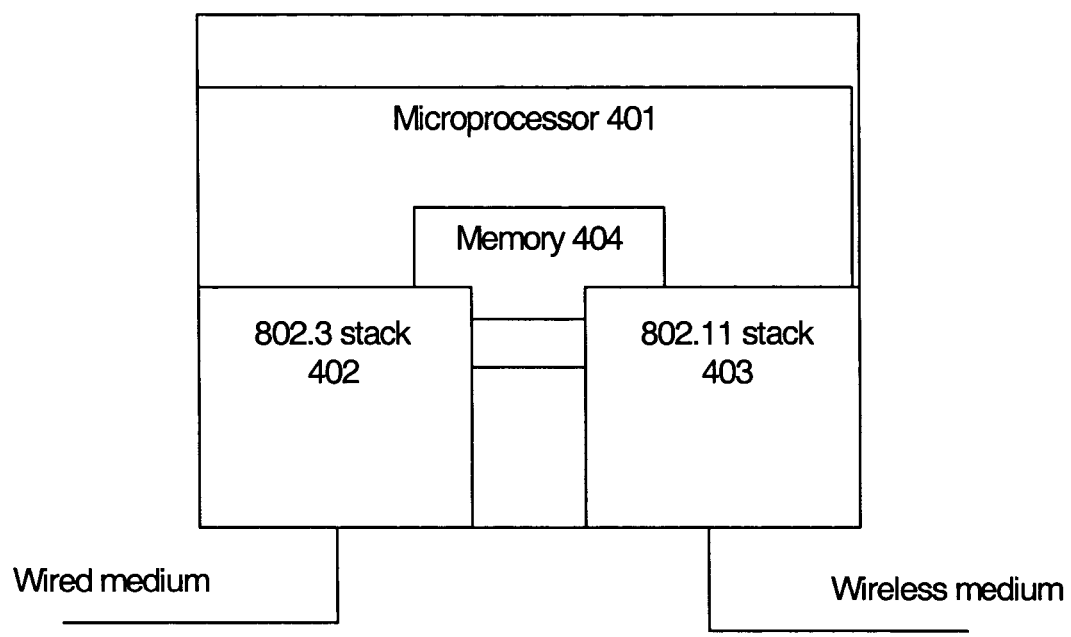
FIG. 4 is a block diagram of a station according to the present embodiment.

FIG. 3 represents the different software modules of a station according to the present embodiment. The station comprises a bridge core 301 implementing the bridge functions of IEEE 802.1D. In particular, it manages spanning tree determination, filtering database learning and ageing processes. The station further comprises a Link Management module 302, as shortly mentioned above. The station of FIG. 3 comprises (as an example) four medium access control (MAC) modules (308-311), corresponding to same or different network technologies. These MAC modules can be referred to as 'ports'. In this example, at least one of the MAC modules is IEEE 802.11 compliant. All MAC modules comprise a medium access layer (304-307) inherited from an abstract medium access class, as well as a physical layer. The bridge core also inherits from this class, in order to provide a MAC-like interface to the upper layers (the LLC in particular). They provide a medium independent interface, i.e. the same interface for any kind of underlying MAC technology. For the purpose of deciding whether messages are to be passed from one port to the others, the bridge core 301 comprises filtering databases (314-317) for each port. Note that while the filtering databases are represented as separate entities on FIG. 3, this representation is functional only and does not exclude any particular implementation, such as storage of data for all filtering databases in a single memory with appropriate port/network identifiers.

The station furthermore comprises a remote configuration module 303 for configuring certain bridge functionalities, a logical link control layer (LLC) 312 and an application 313.

It is to be noted that a station according to the present embodiment is compatible with Access Points defined by IEEE 802.11. The Access Point need not be aware of the specific architecture of the station.

It is also to be noted that the present architecture is also applicable to an access point itself. The behavior in case of use within an access point might differ slightly from that of a station, as described below.

The bridge core operates as defined in IEEE 802.1D, unless specified otherwise.

In particular, the bridge core is in charge of establishing the spanning tree of the entire set of networks. It comprises loop detection and automatic disabling of redundant paths.

According to the present embodiment however, the bridge core module offers the possibility to enable or disable the spanning tree determination process. This switching may be controlled at the level of the application. The resulting states are referred to as BRIDGE_WITH_STP and BRIDGE_WITHOUT_STP.

When the present embodiment is used for an access point, the spanning tree process will be enabled, to conform to IEEE 802.1D. When it is implemented in a station, the spanning tree is either enabled or disabled. It is enabled (typically by the application, at the launching of the module) for example if it is desired to allow the station to take care of loop detection—and eventually letting the user take the necessary corrective actions should there be a loop. This is interesting since the enabling may be made dependent on the type of the network(s) attached to the bridge station. Typically, the STP process is enabled when more than one device is connected to a station, since packet loops may then occur.

As mentioned above, the bridge core maintains a filtering table for each connected network. A filtering table as defined in IEEE 802.1D contains entries corresponding to device source addresses on the corresponding network. In other words, the filtering table contains information enabling the bridge to decide, based on the destination address of a packet detected on one port, whether this packet should be forwarded to the other networks. This is the case if the destination address of this packet is not present in the filtering table corresponding to the originating network.

IEEE 802.1D Section 7.8 defines a learning process, which permits a bridge to update a filtering table by listening to messages on a port. The document also defines an ageing process at section 7.9 for removing entries from a filtering table. According to the present embodiment, the learning process for a given port/network may be enabled or disabled, e.g. by application 313. This is preferably made dependent on:

(a) the possibility of substituting the standard filtering database maintenance processes by other processes, e.g. processes already existing on one network connected to a port, and/or (b) the type of device the bridge is hosted by.

Relative to (a), a USB bus provides efficient means for detecting devices connected to the bus, through a bus reset and discovery mechanism known per se upon connection or disconnection of a device. The standard filtering table update mechanism is then replaced by the USB process. For an Ethernet network, since no specific device discovery process is available, the standard mechanism is enabled.

Relative to (b), when the bridge is hosted by a wireless network Access Point, the latter can, for the wireless network, know which devices are associated or disassociated. Thus, the standard process is disabled in this case and replaced by an updating of the filtering table by making use of the information known by the Access Point. When the bridge is hosted by a station, then the standard mechanism is enabled, for ports for which it is not replaced by an equivalent process as described in (a).

According to the present embodiment, compared to IEEE 802.1D, the bridge core furthermore comprises a switchable filtering database update message generation mechanism. A message is generated by the bridge core each time an entry in a filtering database changes (addition or removal). This message is sent to the Link Management module 302. This message may also be sent to other modules, to provide visibility of bridge filtering database changes. In the present embodiment, the message generation mechanism is enabled for an Ethernet MAC and when the device hosting the bridge is a station from the point of view of the wireless network. This allows the Link Management module to trigger an association or disassociation on the wireless network. Otherwise, the mechanism is not enabled.

According to a variant embodiment, the message generation mechanism is enabled at least for MAC interfaces for which the standard filtering table update mechanism is used. For MAC interfaces for which another update mechanism is used, messages generated by this other mechanism are preferably detected by the LMM. This avoids having the bridge core duplicate configuration change messages already available elsewhere.

To summarize, in the most flexible variant of the embodiment, both the filtering database process and the message generation process from the core to the LMM are selectable per port.

The Link Management module (LMM) has the function of monitoring dynamic changes such as the state—active or inactive—of each MAC module (i.e. the wireless LAN, Ethernet and USB interfaces) and to take the appropriate actions.

In a station, the LMM monitors the state of the MAC interfaces in view of triggering associations and disassociations. In case the standard update mechanism is not used for a MAC interface, the LMM also updates the bridge core's filtering tables for each MAC interface.

In an access point, the LMM monitors associations and disassociations on the wireless network and updates the core's filtering table, the standard update mechanism being disabled. For e.g. USB, the behavior is the same as for a station.

According to the present embodiment, the LMM has two modes of operation, hereafter named LM_WITHOUT_DETECTION and LM_WITH_DETECTION. The 'detection' refers to the general mechanism of triggering or not triggering an association or disassociation based on the results of the learning processes of the different MAC interfaces. While at the level of the bridge core—or at the level of a port itself—the standard message listening process may be enabled or not for each distinct port, the LMM's taking into account or not taking into account for association purposes of the corresponding messages from the bridge core or from a MAC interface is determined globally. The LMM has certain tasks in common for both modes, and some that differ from mode to mode. It is supposed below that the bridge is connected to a USB bus, an Ethernet bus and at least one wireless LAN.

In both cases, the LMM triggers customization (i.e. update) of the bridge filtering tables for devices on networks for which a specific device discovery procedure other than the standard procedure is enabled (i.e. other than the traffic monitoring process). For the MAC interfaces for which the standard procedure is enabled, the bridge filtering table update is anyhow carried out by the bridge core.

E.g. for the USB bus, when a device master on this network is discovered, the LMM receives an appropriate message from the USB MAC interface i.e. port, determines the MAC address of the USB device master and uses this address to call a function of the bridge core to update the corresponding filtering table.

In case the mode LM_WITHOUT_DETECTION is selected, the LMM does not carry out any specific additional task (for the Ethernet network, or another type of network for which the standard message listening process is enabled) compared to the common treatment above. The LMM ignores the messages sent by the bridge core for device discovery due to the standard listening process, as well as similar messages originating directly with certain MAC interfaces.

In case the mode LM_WITH_DETECTION is selected, the LMM carries out, in addition to filtering table update function calls, associations or disassociations of devices on the wireless MAC interface. According to the present example, it obtains the MAC addresses of new devices in order to use this address in the association/disassociation process for registering with the access point.

TABLE 1 summarized the different states of the bridge core and of the LMM, and the corresponding flag setting.

| WBOX | | | Flags for Ethernet MAC | | Flags for Wireless MAC | | Flags for UEP* MAC | |
|---|---|---|---|---|---|---|---|---|
| configuration (OperationMode Type) | Bridge Core | Link Management | learn Enable | post Message Enable | learn Enable | post Message Enable | learn Enable | post Message Enable |
| WLAN AP (AP) | BRIDGE_ WITH_ STP | LM_ WITHOUT_ DETECTION | tmm TRUE | tmm FALSE | tmm FALSE | tmm FALSE | tmm FALSE | tmm FALSE |
| WLAN STA (STA with STP enabled. More than one device can be attached | BRIDGE_ WITH_ STP | LM_ WITH_ DETECTION | tmm TRUE | tmm TRUE | tmm TRUE | tmm FALSE | tmm FALSE | tmm FALSE |
| WLAN STA (STA | BRIDGE_ | LM_WITH_ | tmm | tmm | tmm | tmm | tmm | tmm |

TABLE 1-continued summarized the different states of the bridge core and of the LMM, and the corresponding flag setting.

| WBOX configuration (OperationMode Type) | Bridge Core | Link Management | Flags for Ethernet MAC | | Flags for Wireless MAC | | Flags for UEP* MAC | |
|---|---|---|---|---|---|---|---|---|
| | | | learn Enable | post Message Enable | learn Enable | post Message Enable | learn Enable | post Message Enable |
| with STP disabled. Only one device attached per MAC interface. If more than one PC attached packet looping can occur) | WITHOUT_ STP | DETECTION | TRUE | TRUE | TRUE | FALSE | FALSE | FALSE |

*UEP = USB Ethernet Pipe, i.e. USB MAC.

When the 'learn enable' flag is set for a filtering database (for a given MAC port), this database may be updated with device changes. The 'post message enable' flag indicates whether, for a given MAC port, the bridge core posts change messages to the LMM.

If the wireless interface allows only a limited number of simultaneous MAC addresses on the wireless LAN, and when that maximum number is reached, the LMM requests a disassociation of an existing MAC address before associating an address corresponding to a new device, for example on an relative age or amount of traffic criterion. According to a variant embodiment, when the maximum number of devices is reached, the LMM informs the user and requests input as to whether a device should be disassociated before a new device is associated, or whether the new device should not be associated.

A station, as illustrated by FIGS. 2 and 3, comprises, among other circuitry, a microprocessor 401 for control of the wireless box and for implementing at least part of the protocols 402, 403 necessary to interface with each medium. The corresponding data is stored in a memory 404. Certain parts of the IEEE 802.11 protocols may be implemented using dedicated hardware, instead of software run by the microprocessor. Typically, the multiple association process and subsequent management of several parallel user data flows corresponding to the different MAC addresses will be handled by software, while dedicated hardware is in charge of detecting these MAC addresses in packets on the wireless network and of generating acknowledgment packets. The dedicated MAC hardware can be referred to as IEEE802.11MAC-HW, while the MAC software can be referred to as IEEE802.11MAC-SW. A TCP/IP/http stack places itself above the MAC layer.

The invention claimed is:

1. A device for connecting a centralized wireless network to at least one other network, said device being a wireless station compliant with the IEEE 802.11 or Hiperlan2 standards, said wireless station not being a wireless access point, and further comprising:
a wireless interface for managing more than one MAC address for association with an access point of said centralized wireless network, wherein said associations are as defined by the IEEE 802.11 or Hiperlan2 standards;
a bridge module for managing a plurality of ports for connecting to respective networks;
a link management module for managing associations of different MAC addresses corresponding to devices connected to said at least one other network with said access point of said centralized wireless network such that said devices connected to said at least one other network will appear as wireless stations to the access point; and
said device having two protocol stacks, one of said protocol stacks being an IEEE 802.11 protocol stack, said IEEE 802.11 protocol stack operating to control a wireless network.

2. The device according to claim 1, further comprising means for determining a spanning tree for all networks attached to the device, comprising means for enabling or disabling the determination of the spanning tree.

3. The device according to claim 1, further comprising means for updating filtering tables for respective connected networks, said filtering tables comprising information for determining whether a-message on a-network is to be forwarded to another network, said updating using a process by default, comprising means for enabling or disabling the default process.

4. The device according to claim 3, wherein said default process is based on analysis of source addresses in messages detected on a respective network, comprising means for enabling or disabling message detection based updating.

5. The device according to claim 3, further comprising means for updating a filtering table for a given network based on a device discovery process specific to said given network.

6. The device according to claim 3, wherein said default process is enabled for an Ethernet network.

7. The device according to claim 3, wherein said default process is disabled for a USB network.

8. The device according to claim 1, further comprising means for generating a message to said link management module upon a filtering table amendment, said means for generating having an enabled state and a disabled state for each network.

9. The device according to claim 8, wherein said means for generating a message is enabled for an Ethernet network.

10. A method for connecting a centralized wireless network to at least one other network, said method comprising:
managing, by a wireless station, more than one media access control (MAC) address for association with an access point of said centralized wireless network, said wireless station not being an access point, and further wherein said wireless station being compliant with IEEE 802.11 or Hiperlan2 standards, wherein said associations are as defined by the IEEE 802.11 or Hiperlan2 standards;

managing a plurality of ports for connecting to respective networks;

managing associations of different MAC addresses corresponding to devices connected to said at least one other network with said access point of said centralized wireless network such that said devices connected to said at least one other network will appear as wireless stations to the access point; and controlling a wireless network by an IEEE 802.11 protocol stack, said IEEE 802.11 protocol stack being one of two protocol stacks of said wireless station.

* * * * *